United States Patent [19]

Domes

[11] Patent Number: 4,652,861
[45] Date of Patent: Mar. 24, 1987

[54] METHOD AND APPARATUS FOR PROTECTING BURIED OPTICAL FIBER CABLE

[75] Inventor: David C. Domes, Pacheco, Calif.

[73] Assignee: GTE Sprint Communications Corporation, Burlingame, Calif.

[21] Appl. No.: 741,048

[22] Filed: Jun. 4, 1985

[51] Int. Cl.[4] .............................................. G08B 21/00
[52] U.S. Cl. ...................................... 340/539; 324/67; 340/540; 340/572; 455/67
[58] Field of Search ............... 340/539, 540, 572, 528, 340/529, 530; 324/67, 335, 329, 324; 455/67, 40

[56] References Cited

U.S. PATENT DOCUMENTS 3,916,298 10/1975 Ulrich .................................... 324/67
4,044,299 8/1977 Weber .................................... 324/67

Primary Examiner—Glen R. Swann, III
Attorney, Agent, or Firm—Russell A. Cannon; Douglas M. Gilbert

[57] ABSTRACT

The output of an LF transmitter that operates at a prescribed frequency is coupled to an electrically conductive rodent shield on a buried optical fiber cable. The rodent shield operates as an elongated underground antenna that transversely radiates an electromagnetic field that preferably propagates beyond the surface of the ground. A receiver that is located on a piece of earth working equipment generates a warning signal when the equipment moves a receiving antenna such that it picks up signals of the prescribed frequency that are radiated by the buried optical fiber cable. Unique tone signals that can be modulated onto the prescribed signal are assigned to associated cable companies. A prescribed signal that is modulated with a single tone signal is only applied to optical fiber cables of the associated cable company to provide an equipment operator with the identity of the owner of the cable that he is near. The equipment operator can then contact the cable company so that it can send someone out to protect its cable.

9 Claims, 4 Drawing Figures

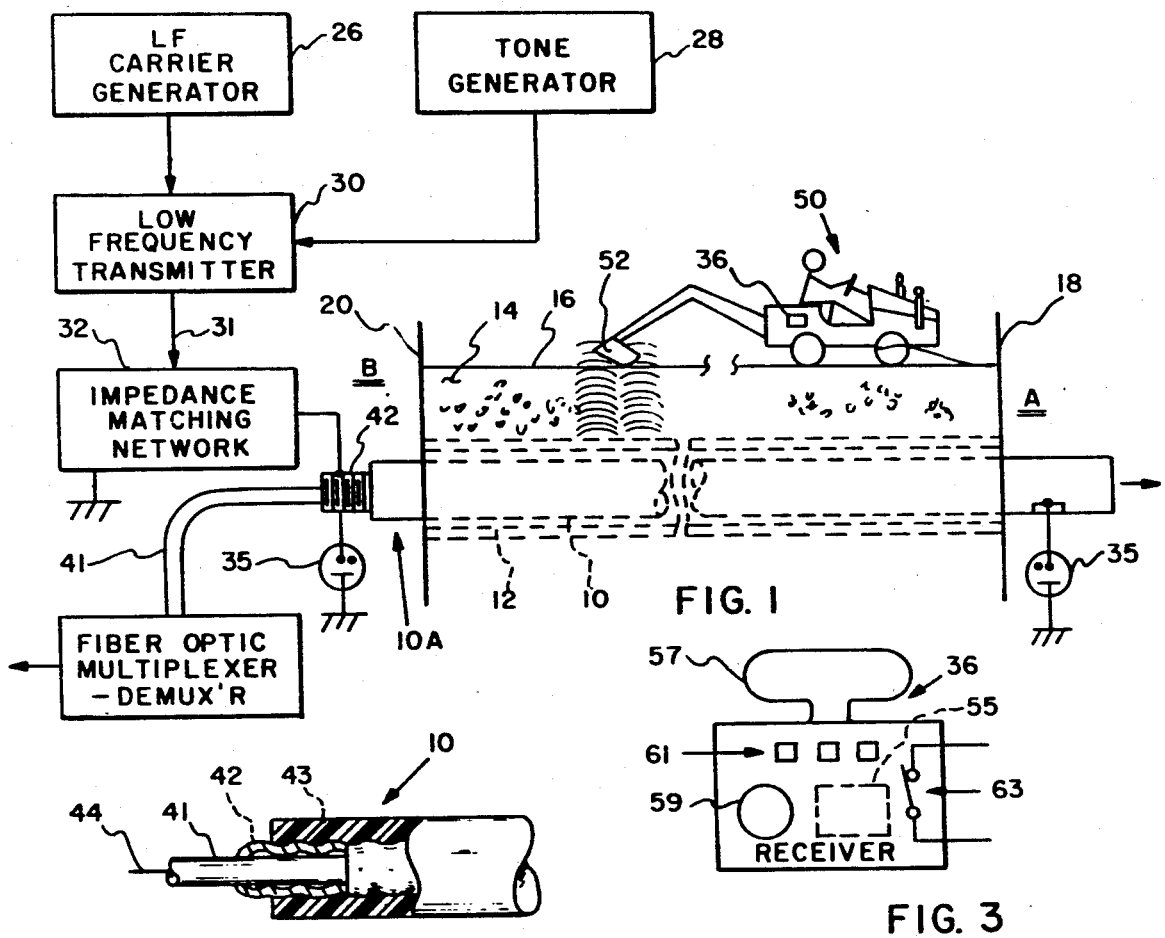
FIG. 1
FIG. 2
FIG. 3
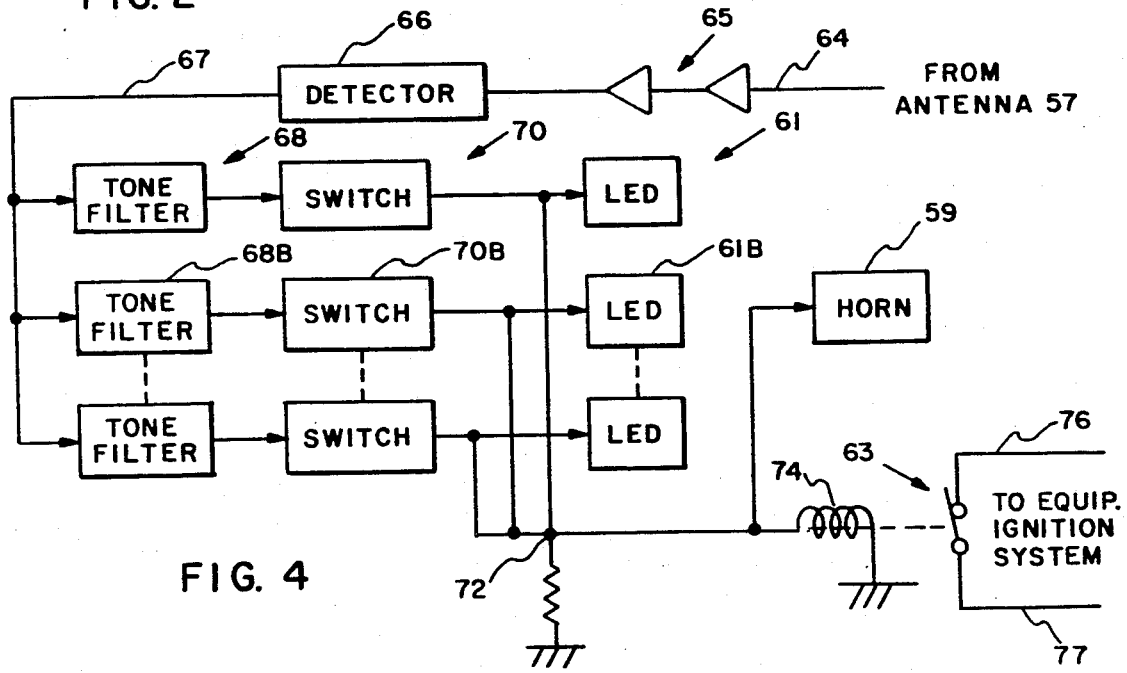
FIG. 4

METHOD AND APPARATUS FOR PROTECTING BURIED OPTICAL FIBER CABLE

BACKGROUND OF THE INVENTION

This invention relates to the protection of buried optical fiber cables and more particularly to method and apparatus of making an earth working equipment or other operator aware of the fact that his equipment may be operated in the area of a buried optical fiber cable (OFC).

The use of buried OFC is becoming common place in the communication industry in both local and trunk applications. In the past it was not necessary to provide rodent protection of buried copper telephone cables that were used for trunk applications since the diameters of such cables were so large that rodents could not gnaw on them. Buried OFC is sufficiently small, however, (typically in the ¾ to 1½ inch outer diameter range) that it is susceptible to being gnawed on by rodents. It was therefore recommended at a recent Society of Photographic Instrumentation Engineers meeting that all buried OFC contain a metallic rodent shield, whether the cable is buried directly in the ground or pulled into ducting in the ground. A rodent shield is typically an electrically conductive corrugated bellows type sleeve made of aluminum, copper, or stainless steel that extends over the full length of the OFC so that the cable can be readily rolled up onto a spool. Alternatively, the rodent shield may be an electrically conductive wire mesh or braided sleeve. Additionally, the OFC may be formed with more than one rodent shield. And since buried OFC is underground and hidden from view it is continuously subject to damage by earth working equipment that may be carelessly or inadvertently operated in the area of such a cable.

An object of this invention is the provision of method and apparatus for protecting buried OFC.

SUMMARY OF THE INVENTION

In accordance with this invention, electromagnetic wave signals of a prescribed frequency are circumferentially radiated from an optical fiber cable that is buried in the ground. When it is desired to operate earth working types of construction equipment in a particular area, the area is checked for the presence of radio waves of the prescribed frequency. Detection of such a radio wave signal of the prescribed frequency causes a warning device to be activated which alerts an operator to the fact that an optical fiber cable may be buried in the ground in the work area. In a preferred embodiment, different unique modulation frequencies are assigned to associated owners of optical fiber cables. A carrier signal of the prescribed frequency that is modulated with a particular unique signal is applied to all optical fiber cables of the associated company so that an equipment operator can rapidly and uniquely identify which companies' buried cable he is near. An operator conducting a site survey of or working in an area can then call a particular cable owner so that someone can be sent out to protect the cable.

BRIEF DESCRIPTION OF DRAWINGS

This invention will be more fully understood from the following detailed description of preferred embodiments thereof taken in relation to the drawings in which:

FIG. 1 is a schematic block diagram of equipment embodying and useful for practicing the method of this invention for protecting an optical fiber cable 10 that is buried in the ground.

FIG. 2 is a greatly enlarged section view of the optical fiber cable 10.

FIG. 3 is an enlarged front elevation view of the receiver equipment 36 in FIG. 1.

FIG. 4 is a schematic block diagram of the receiver circuitry 55 in FIG. 3.

DESCRIPTION OF PREFERRED EMBODIMENTS

The optical fiber cable 10 in FIG. 1 is located in a duct 12 that is buried in the ground, the duct 12 extending continuously between stations A and B. The station A is bounded by the line 18 which represents the wall of a manhole. The cable 10 may extend through the manhole at A and into another duct (not shown) for eventual connection to optical fiber multiplexer-demultiplexer equipment, for example. The station B is bounded by the line 20 which represents the wall of a building that houses central office equipment (not shown) and equipment 26-35 for protecting the cable 10 in accordance with this invention. If station B were another manhole that housed the equipment 26-35 then the end 10A of the cable would extend through the manhole at B and into another duct (not shown) for eventual connection to optical fiber multiplexer-demultiplexer equipment.

Referring now to FIG. 2, an optical fiber cable 10 typically comprises a central bundle 41 of optical fibers, a corrugated electrically conductive metallic rodent shield 42, and a polyethylene outer cover 43. The shield 42 may be made of aluminum, copper, stainless steel or some other highly conductive material. Alternatively, the metallic rodent shield may comprise a wire mesh or braided type conductive sleeve. In accordance with this invention the conductive rodent shield 42 is preferably insulated from earth ground although this is not an absolute necessity. Gas tubes 35 which are typically rated at 600 volts are then periodically connected between the shield 42 and earth ground to provide lightening protection of equipment and personnel. Some optical fiber cables include an electrically conductive central stiffener wire 44.

Apparatus in FIG. 1 for protecting the cable 10 from being damaged by operation of earth working equipment 50 in the area of the cable comprises a low frequency (LF) carrier generator 26, a tone generator 28, and an LF low power transmitter 30 that are located at the station B; and receiver equipment 36 that is located on the equipment 50. Alternatively, the receiver equipment 36 may be carried during a site survey of the area where the equipment 50 is to be operated in order to determine whether an optical fiber cable is buried there prior to relocating the earth working equipment.

The generator 26 provides an LF carrier frequency signal having a frequency that is typically in the 50-200 kHz range. In contrast, the generator 28 produces an audio tone having a fixed frequency such as 463 Hz. In accordance with another aspect of this invention each owner or proprieter of optical fiber cables is assigned a different unique audio frequency such as f1 for GTE Sprint, f2 for AT&T Corporation, f3 for MCI, etc. A unique frequency f5 may also be assigned to miscellaneous OFC owners. Each OFC owner then uses its assigned tone frequency on each and every optical fiber cable that it owns and has buried in the ground. The tone signals are preferably not harmonically related. The tone signal is modulated onto the LF carrier frequency signal in circuit 30 which may be a Model 6515 Power Line Carrier System manufactured by RFL Industries in Boonton, N.J. This transmitter will generate either single frequency or modulated LF output signals of up to around 120 watts of RF power. The modulated output signal of the transmitter 30 is coupled on a coaxial cable 31 to a network 32 which matches the output impedance of transmitter 30 to that presented between the rodent shield 42 and earth ground. The tone modulated LF signal is then transmitted along the rodent shield 42 that essentially operates as an elongated antenna which generates an electromagnetic field in the ground around the cable. This field radiates away from the cable and some distance past the surface 16 of the ground.

The receiver equipment 36 comprises receiver circuitry 55 for demodulating the LF signals (see FIG. 4), an antenna 57, a horn 59, a bank of lights 61, and a normally closed switch 63. The antenna 57 may be a ferrite loop stick antenna which is a tuned circuit element that is particularly useful in picking up low level amplitude modulated LF signals. The lights 61 are high reliability devices such as light emitting diodes (LED's).

The receiver circuitry 55 essentially comprises a pair of cascaded operational amplifiers 65, a detector circuit 66, and a bank 68 of tone filter means that are parallel fed with the output of the detector 66 and which drive associated switch means of a bank 70 thereof. The output of each switch means is connected to an associated one of the LED's and to a summing junction 72 for driving the horn 59 and energizing a relay coil 74.

The amplifiers 65 are high gain amplifiers for increasing the intensity of what may be very low level LF signals from the antenna 57. The detector 66 may be a diode detector-demodulator which extracts the tone signal from the LF carrier signal. The tone filter means 68 preferably comprises phase lock loop tone decoders, each of which detects a different single one of the unique tone frequencies that may be in the output of the detector 66. The tone decoders are commercially available as small semiconductor chip devices that are relatively inexpensive. Alternatively, each of the filter means may be a bandpass filter circuit. Only the filter means 68 that is tuned to a particular tone frequency on line 67 detects that tone and closes the associated one of the switches 70. This illuminates the associated one of the LED's 61, activates the warning horn 59, and energizes the relay 74 for opening switch 63 and temporarily disabling the equipment 50.

Consider for example that the optical fiber cable 10 belongs to a communication carrier that is assigned a unique tone frequency of 463 Hz. The transmitter 30 then modulates a 100 kHz LF carrier signal with this unique 463 Hz tone signal and drives the rodent shield 42 at a level that is sufficient to cause the cable to radiate an electromagnetic field that extends above the surface of the ground. An above ground LF antenna 57 that is located in the general area of the cable will then pick up the radiated-amplitude-modulated LF signal. This signal is amplified, demodulated by circuit 66, and decoded or sensed by only the tone filter 68B (for example) for closing only the associated switch 70B. This illuminates only the lamp 61B which identifies which communication company owns or is responsible for an optical fiber cable that is now believed to be buried in the area of the receiver equipment 36. The equipment operator or person conducting a site survey with the receiver equipment 36 can then contact the cable owner to notify him that earth working equipment is or will be operating in the area of his optical fiber cable so that he can protect the cable from physical damage by the equipment. The output of switch 70B is also applied to horn 59 to audibly warn an operator of the presence of an optical fiber cable. Also, when the receiver equipment 36 is actually located on equipment 50 that is working in the field, the lines 76 and 77 of the normally closed switch 63 can be connected in series with the ignition system of the earth working equipment. If the equipment then moves into an area containing a buried optical fiber cable the output of the associated one of the switch circuits 70 will energize the coil 74 and open switch 63 for temporarily disabling the equipment and warning the operator of the presence of an optical fiber cable in his work area.

Although this invention is described in relation to preferred embodiments thereof, variations and modifications are possible. By way of example, the output signal of the LF transmitter 30 may be coupled through an impedance matching network to another electrically conductive element such as a stiffener wire 44 in an optical fiber cable bundle. Alternatively, the output of the LF transmitter 30 may be directly connected to a conductive element of an optical fiber cable or to a rodent shield of an optical fiber cable that is periodically directly electrically connected to ground over the length thereof. Additionally, the LF transmitter may be connected to the rodent shield at an intermediate point in the length thereof such as at an intermediate manhole. Further, it may be possible to drive the rodent shield on an extremely long length of cable from opposite ends and/or intermediate points thereof. Also, where the end 10A of an optical fiber cable extends into a building, this end of the cable that contains an energized rodent shield may be enclosed in an RF shield for preventing the LF signal being radiated throughout the building. Additionally, the system may be operated by impressing an unmodulated LF signal from generator 26 on the rodent shield 42. The associated receiver then comprises a carrier frequency detector that drives an associated switch means rather than the banks 68 and 70 of filter and switch means. The scope of this invention is therefore to be determined from the appended claims rather than from the aforementioned detailed descriptions of preferred embodiments thereof.

What is claimed is:

1. A system for indicating that an optical fiber cable may be buried in the ground under a prescribed surface area thereof, wherein said cable is enclosed in an electrically conductive rodent shield extending over at least the portion of the length of the cable under the surface area of interest, said system comprising:

first means including a radio frequency generator connected to said shield, said means creating an electromagnetic radiation field of a prescribed radio frequency in the ground around the buried cable radiating away from the cable and extending above the surface of the ground;

second means located in the area for detecting any radio wave signal of the prescribed frequency; and third means responsive to the operation of said second means for indicating that an optical fiber cable may be buried in the ground under the area.

2. The system according to claim 1 wherein said radio frequency generator has a carrier frequency output signal, said first means further comprising fifth means for generating a unique modulation frequency signal and sixth means for modulating said carrier frequency signal with said unique modulation frequency signal.

3. The system according to claim 2 wherein said second means comprises seventh means for demodulating any modulated carrier signal that is detected in the area; said third means being responsive to the demodulated signal from said seventh means for providing an indication thereof.

4. The system according to claim 3 wherein a different unique modulation frequency is assigned to each of a number of companies having optical fiber cable that is buried in the ground; said third means being responsive to the demodulated signal from said seventh means for providing an indication of the particular company to which the particular modulation frequency is assigned.

5. The system according to claim 4 wherein the optical fiber cable has means for electrically insulating said rodent shield from the earth ground; said system further comprising lightening protection devices that are electrically connected between the rodent shield and the earth ground for protecting the cable from lightening.

6. The method of detecting that an optical fiber cable is buried in the ground under a prescribed surface area thereof, said cable having an electrically conductive shield extending over at least a portion of the length of the cable, said method comprising the steps of:

generating a radio frequency (rf) signal;

directly coupling said rf signal to the electrically conductive shield for transmission along the length of cable so as to generate an electromagnetic radiation field around the circumference of the cable which radiates away from the cable and extends above the surface of the ground;

detecting any radio wave signal of the prescribed frequency in said area; and indicating that an optical fiber cable may be buried under said area when a radio signal of the prescribed frequency is detected in the area.

7. The method according to claim 6 wherein said rf signal has a carrier frequency and further comprising the steps of generating a unique modulation frequency signal, and modulating said rf signal with said unique modulation frequency signal, said coupling step comprising coupling the modulated carrier frequency signal to the electrically conductive shield.

8. The method according to claim 7 further comprising the step of demodulating any modulated carrier frequency signal detected in the area; said indicating step comprising sensing the modulation frequency in the demodulated signal for providing an indication thereof.

9. The method according to claim 8 wherein a different unique modulation frequency is assigned to each of a number of companies who have buried optical fiber cables, said indicating step comprising sensing a particular unique modulation frequency in the demodulated signal, and providing an indication of the company to which the particular modulation frequency is assigned.

* * * * *